United States Patent
Wyers (10) Patent No.: US 7,698,915 B2
(45) Date of Patent: Apr. 20, 2010

(54) LOCKING DEVICE

(76) Inventor: Philip W. Wyers, 14705 E. Arberdeen Ave., Centennial, CO (US) 80016

( * ) Notice: Subject to any disclaimer, the term of this patent is extended or adjusted under 35 U.S.C. 154(b) by 68 days.

(21) Appl. No.: 10/548,450

(22) PCT Filed: Mar. 10, 2004

(86) PCT No.: PCT/US2004/007447

§ 371 (c)(1),
(2), (4) Date: Jun. 30, 2006

(87) PCT Pub. No.: WO2004/085770

PCT Pub. Date: Oct. 7, 2004

(65) Prior Publication Data

US 2006/0236730 A1    Oct. 26, 2006

(51) Int. Cl.
 *E05B 67/36* (2006.01)
(52) U.S. Cl. .................... 70/33; 70/14; 70/20
(58) Field of Classification Search ............. 70/14, 70/18–20, 31–38, 58, 258
See application file for complete search history.

(56) References Cited

U.S. PATENT DOCUMENTS

| | | | | |
|---|---|---|---|---|
| 2,999,377 A * | 9/1961 | Raye | .............................. | 70/32 |
| 3,820,283 A | 6/1974 | Acerra et al. | | |
| 4,068,504 A * | 1/1978 | Pickard | .......................... | 70/18 |
| 5,442,941 A * | 8/1995 | Kahonen et al. | ................ | 70/34 |
| 5,987,939 A * | 11/1999 | Pitisettakarn | ................... | 70/33 |
| 6,055,832 A * | 5/2000 | Wyers | ............................ | 70/34 |
| 6,408,661 B1 * | 6/2002 | Chen | ............................... | 70/33 |
| 6,644,071 B2 * | 11/2003 | Gilbertson et al. | .............. | 70/14 |
| 6,935,871 B2 * | 8/2005 | Maurer, Jr. | ....................... | 70/53 |

OTHER PUBLICATIONS

International Searching Authority Notification of Transmittal of the International Search Report and the Written Opinion of the International Searching Authority, or the Declaration) dated Jan. 11, 2005.

* cited by examiner

*Primary Examiner*—Peter M Cuomo
*Assistant Examiner*—Christopher Boswell
(74) *Attorney, Agent, or Firm*—Holland & Hart LLP

(57) ABSTRACT

A locking device includes a first and second body members that may optionally include laterally projecting arms. A retainer element has end portions respectively received in the interiors of the first and second body members and mechanically links them for longitudinal movement between collapsed and expanded orientations. The retainer element also moves between a retain position and a release position that respectively secure the body members in the collapsed orientation and allows them to move to the expanded orientation. A lock core is operative to engage the retainer element. In a locked state, the lock core holds the retainer element in the retain position and in an unlocked state that moves the retainer element to the release position. A shackle may extend between arms on the first and second body members in order to enclose a locking region when the bodies are in the collapsed orientation.

36 Claims, 5 Drawing Sheets

LOCKING DEVICE

FIELD OF THE INVENTION

The present invention broadly concerns locking devices. More particularly, the present invention relates to a locking device such as a padlock or the like. The present invention specifically is directed to a locking device particularly useful for locking trailer hitch couplers.

BACKGROUND OF THE INVENTION

Over the years, there have been numerous variations of locking devices for a multiple of applications. Typically, a locking device is used to secure objects together, whether it be two independent items, a door for an enclosure, or the like. A locking mechanism may be either key actuated wherein a key is used to turn a locking core or are of a combination type wherein a set of disks are manipulated based on a code.

A widely used locking device is known as the padlock. The standard padlock includes a housing containing the lock core and latch elements. A U-shaped shackle extends from the housing with one leg of the U-shaped shackle being pivoted with respect to the housing. When the padlock is in an unlocked state, the shackle may be rotated so that a free end of the shackle may be inserted through openings, around an object, or the like. The shackle is then rotated back to the alignment and compressed into the housing so that the free end becomes latched by the latching structures contained therein.

The prior art padlock works adequately for a number of conventional applications when the span of the objects to be secured is relatively short or when the span can be fitted with a hasp. However, where the span is larger, it is sometimes difficult to employ a traditional padlock due, in part, to the curvature of the shackle. For this reason, some padlocks are provided with a shackle having elongated legs. In most instances, however, it is desirable to create a locking structure that is resistant to tampering or compromise. Since one of the weakest points in a lock is the shackle, it is desirable that the shackle have reduced accessibility when it is used for its designated purpose. Padlocks having these U-shaped shackles may be subjected to compromise however since the elongated dimension of the legs allows access such that the lock may be cut or broken off of the objects which it is to secure.

Another type of locking device related to the padlock may be referred to as a "locking pin". Here, a shackle includes an elongated shaft having a stop portion such as an enlarged head formed at one end and a latching portion opposite the stop portion. A locking head is then releasable and lockably securable to the latch end of the shackle. The locking head carries a lock core and latch elements to engage the latch structure. While such a device is quite useful in covering longer spans, it has the disadvantage in that the two pieces of the lock are separable so that one may readily become misplaced.

One industry wherein a wide variety of locking devices are employed is the towing industry, especially the recreational vehicle towing industry. Here, a trailer vehicle, such as utility trailer, recreational trailer or the like is towed by a tractor vehicle, such as a car or truck. It is necessary to link the tractor vehicle to the trailer vehicle by some form of a tow hitch. Typically, a hitch ball is secured to the tractor vehicle either directly to the frame or by way, of a hitch receiver and hitch bar. The trailer vehicle has a tongue that carries a coupler in the form of a hitch ball receiver and a lever like latch is used to secure the hitch ball receiver onto the hitch ball in a releasable manner. In such an arrangement, numerous releasable connections are present and may be subject to compromise and result in the theft of the trailer vehicle. For example, where a hitch receiver and hitch bar are used, removal of the hitch pin that secures them together will allow the trailer vehicle to be removed even though the hitch ball remains in the hitch ball receiver since the tow bar is removed from the hitch receiver. Therefore, the use of locking hitch pins is known. Further, since the lever latch securing the hitch ball receiver to the hitch ball may be used to release the hitch ball, it is known to lock the lever lock or "coupler" to prevent unwanted detachment of the trailer vehicle from the tractor vehicle.

In order to lock the coupler, a conventional padlock may, and commonly is used. However, a substantial portion of the shackle of such a traditional padlock is exposed so that it is not difficult to cut the padlock off of the trailer coupler lever thereby allowing manipulation of the lever either to remove the trailer from the tractor vehicle or to gain access to the hitch ball receiver to attach another tractor vehicle. While pin type locks may be used to lock the trailer hitch coupler lever, these devices are also subject to attack, for example, by a hacksaw, that is used to sever the shaft of the shackle thereby allowing it to be released from the vehicle.

As a result of these disadvantages, there has been a long felt need for better locking mechanisms, especially for use with trailer hitch couplers. There is a need for a locking device that is subject to attack and compromise. There is a further need for locking devices that are more conveniently employed in trailer hitch coupling applications. The present invention is directed to meeting these needs.

SUMMARY OF THE INVENTION

It is an object of the present invention to provide a new and useful locking device which is simple yet sturdy in construction.

It is another object of the present invention to provide a locking device that may be particularly used on trailer hitch couplers.

A further object of the present invention is to provide a locking device wherein the portions thereof may not be disconnected.

Still a further object of the present invention is to provide a key operable locking device having a pleasing, symmetrical appearance.

According to the present invention, then, a locking device is provided that includes a first body member having a first interior and a second body member having a second interior. A retainer element includes a first end portion received in the first interior and a second end portion received in the second interior. Thus, the retainer element mechanically links the first and second body members together for longitudinal movement between a collapsed orientation and an expanded orientation. The retainer element is moveable between a retained position wherein the retainer element secures the first and second body members and the collapsed orientation and a release position wherein the first and second body members may move between the collapsed orientation and the expanded orientation. A lock core is then disposed in the first interior and is operative to engage the retainer element. The lock core has a locked state wherein the retainer element is held in the retain position, but the lock core is moveable to an unlocked state wherein the retainer element is moved from the retain position to the release position. Here, also, the lock core is disclosed to be key actuable.

In the disclosed embodiment, the first body member includes a first housing portion and a first arm portion extending laterally of the first housing portion. Likewise, the second body member includes a second housing portion and a second arm portion extending laterally from the second housing portion. The first and second arms are in opposed relation to one another when the first and second body members are in the collapsed orientation and the retainer element in the retain position. As disclosed, the first and second arms are in generally parallel spaced-apart relation to one another when the first and second body members are in the collapsed orientation.

A shackle member extends between the first and second body members in order to enclose a locking region when the first and second body members are in the collapsed orientation. In the disclosed embodiment, the shackle is in the form of an elongated shackle post that extends between the first and second arm portions. To this end, one end of the shackle post is secured to one arm and the other arm is provided with a bore that receives a free end of the shackle post when the first and second body members are in the collapsed orientation.

A sealing member is provided to facilitate a seal between the first and second body members when in the collapsed orientation. To this end, also, a protective sleeve may be provided to extend between the first and second body members. The sealing member may be an O-ring and, together with the sleeve, help protect against the ingress of unwanted contaminant materials into the interiors of the housings. At least one of the first and second body members is longitudinally moveable within the sleeve when the first and second body members are moveable between the collapsed and expanded orientations. A cap may be provided to selectively cover the keyway of the locking core.

In the disclosed embodiment, a catch is provided in the second interior, and the retainer element includes a latch portion that is operative to engage the catch when the retainer element is in the retain position and to release from the catch when in the release position. Here, also, the retainer element may include a retaining head that is operative the engage the catch when the first and second body members are in the expanded orientation thereby to prohibit movement of the first and second body members away from one another beyond the expanded orientation. This catch may be defined by a transverse pin, and the latch portion may include a latch groove formed in the retainer element that is sized and adapted to engage the latch pin. The latch portion of the retainer element includes a flat cam face that, in the disclosed embodiment, extends between the latch groove and the retaining head. The flat cam face permits relatively longitudinal movement of the transverse pin and the retainer element between the expanded and collapsed orientations. The retainer element may also include limit stops operative to constrain movement of the retainer element rotationally between first and second angular positions.

The first and second body members are disclosed to be rotatable with respect to one another about a rotational axis when in the expanded orientation. When in the expanded orientation, the first and second housing portions may be rotated 360° relative to each other about the rotational axis. To this end, the first end portion of the retainer element is rotatably disposed by the retainer axis in the first interior and the second end portion of the retainer element is rotatably disposed about the retainer axis in the second interior. The retainer axis and the rotational axis may be co-axial. The lock core is then rotatably mounted in the first interior such that the lock core rotates when it is moved between the locked and unlocked states thereby to rotate the retainer element between the retain and release positions.

With further detail, the first body member includes a first housing portion with the first arm portion extending laterally thereof. The second body member includes a second housing portion with the second arm portion extending laterally thereof. The first housing portion may include a cylindrical nose projecting longitudinally thereof. The first interior is then defined by a cylindrical nose bore formed in the nose and in communication with a cylindrical core bore formed in the first housing portion. The retaining element includes a base received in the core bore and a shank portion extending longitudinally of the base and received in the nose bore. The retaining element further includes a latch portion projecting longitudinally outwardly of the nose. The lock core is also received in the core bore so that it may engage the retainer. The second interior of the second housing portion has a latch cavity sized and adapted to slideably and rotatably receive the latch portion of the retainer element. The second interior also includes a nose cavity sized and adapted to slideably and rotatably receive the nose of the first housing therein. The second housing portion may terminate in a rim that faces a seat formed on the first housing portion. The O-ring sealing member may then be positioned at the seat whereby, when the first and second body members are in the collapsed orientation, the O-ring engages the rim and the seat.

These and other objects of the present invention will become more readily appreciated and understood from a consideration of the following detailed description of the exemplary embodiments of the present invention when taken together with the accompanying drawings, in which:

DETAILED DESCRIPTION OF THE
EXEMPLARY EMBODIMENTS

The present invention broadly concerns locking devices, but it is particularly directed to a mechanical locking device that may be used to secure to objects together. This locking device has particular application to lock the latch lever of a trailer hitch coupler, although it should be understood that the locking device of the present invention is not restricted to such application, but is rather to describe with respect to this application for illustrative purposes only. Thus, the aspects of the present invention may be applied to padlocks in general.

Figure 1:
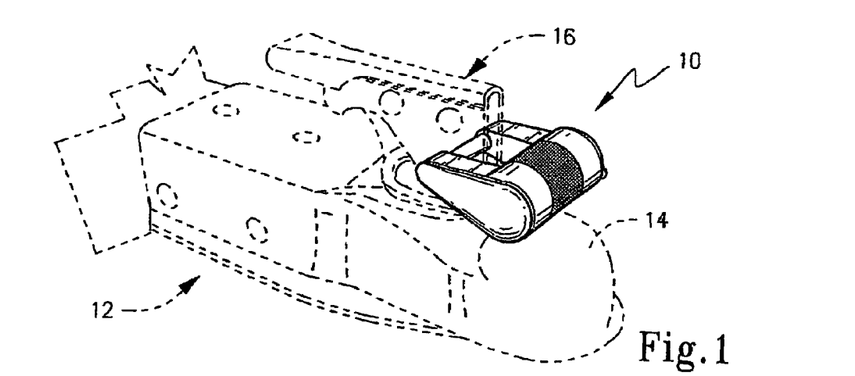
FIG. 1 is a perspective view showing the locking device according to the exemplary embodiment of the present invention attached to the lever actuator of the trailer hitch coupler (shown in phantom)

With reference, then, to FIG. 1, it may be seen that locking device 10 according to the present invention is shown in a mounted state to a trailer hitch coupler 12 the structure of which is shown in phantom. Trailer hitch coupler 12 includes a hitch ball receiver portion 14 that mounts on a hitch ball. A latch lever 16 is shown in a latched state, but as is understood, without a lock, it is pivotal from the position shown to a 90° orientation to release a latching mechanism associated with the hitch ball receiver portion so that, when in one orientation, a hitch ball may be mated and removed from the hitch ball receiver portion while, in the other position, the latching structure retains the hitch ball in the hitch ball receiving portion.

Figure 2:
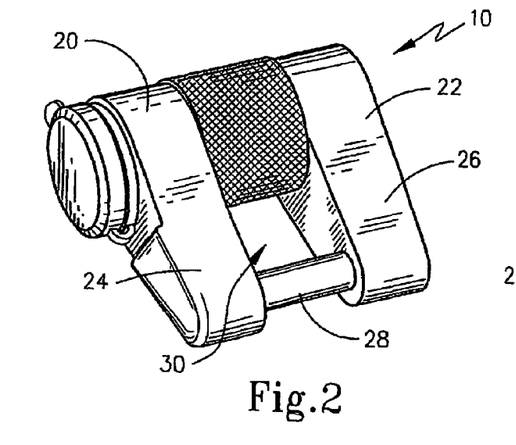
FIG. 2 is a perspective view of a locking device of FIG. 1 with the locking device being in a locked state.
Figure 3:
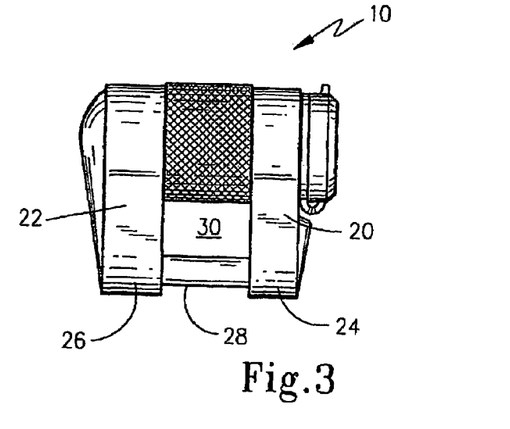
FIG. 3 is a right side view in elevation of the locking device of FIGS. 1 and 2 shown in a locked state.
Figure 4:
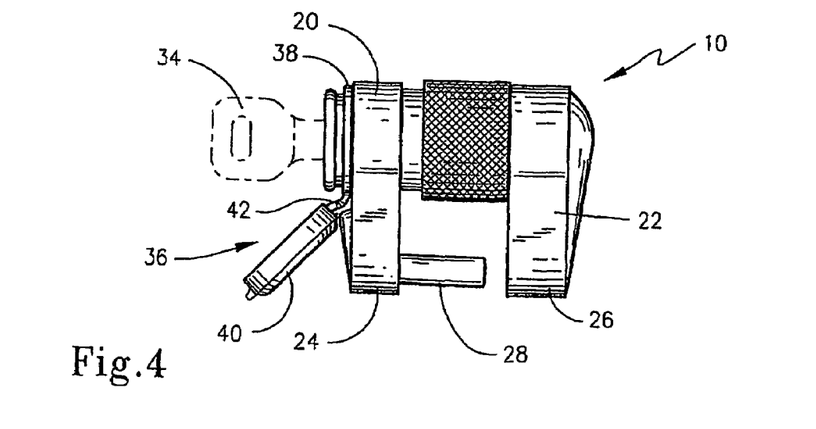
FIG. 4 is a left side view in elevation of the locking device of FIGS. 2 and 3 shown in an unlocked state and with a key therefore being shown in phantom.

The locking device 10 illustrated in FIG. 1 may be seen in greater detail in FIGS. 2-4. In FIGS. 2 and 3, the locking device is shown in the locked state while, in FIG. 4, locking device 10 is shown in the unlocked state. In these figures, it may be seen that locking device 10 includes a first body member 20 and a second body member 22 each having a generally tear drop shape. Thus, body member 20 has a first arm 24 extending laterally thereof that is in generally parallel, spaced apart, opposed relation to second arm 26 that extends laterally of second body member 22. An elongated and linear shackle post 28 extends between first body member 20 and second body member 22 and, in particular, between the ends of first arm 24 and second arm 24 so as to define a locking region 30 therein.

Figure 5:
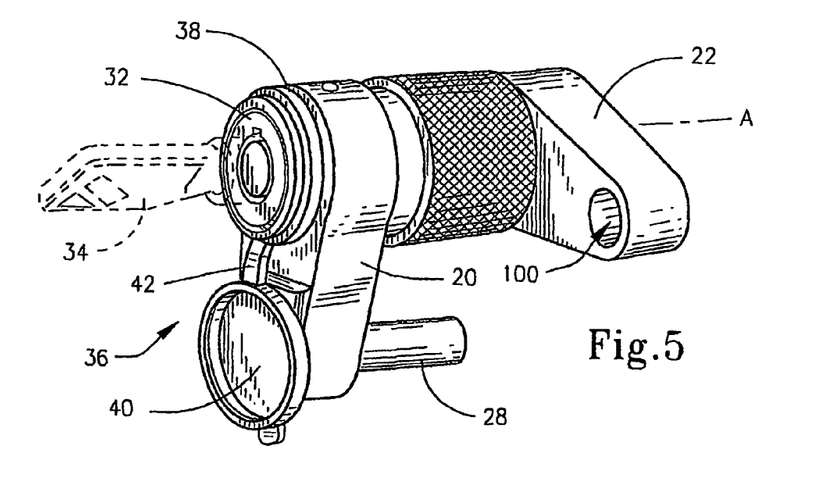
FIG. 5 is a perspective view of the locking device of FIGS. 2-4 shown in an unlocked state and with one of the body members thereof rotated with respect to the other body member thereof.

With reference to FIGS. 3-5, it may be seen that first body member 20 and second body member 22 are mechanically linked for movement between a collapsed orientation such as shown in FIG. 3 to an expanded orientation such as shown in FIGS. 4 and 5. Moreover, when in the expanded orientation, they may be relatively rotated about longitudinally extending central rotational axis "A". Also, as is best illustrated in FIG. 5, it may be seen that first body member 22 has a lock core 32 disposed therein that, in this embodiment, is key actuable by means of a cylindrical key 34 (shown in phantom). A protective cap 36 includes a mount in the form of an annular ring 38 which secures a cap portion 40 thereto by means of a hinge piece 42. Cap portion 40 may thus be pivoted between a position wherein it is mounted over lock core 32, as is shown in FIGS. 2 and 3, to a position wherein lock core 32 is exposed for access by key 34, as illustrated in FIGS. 4 and 5.

Figure 6:
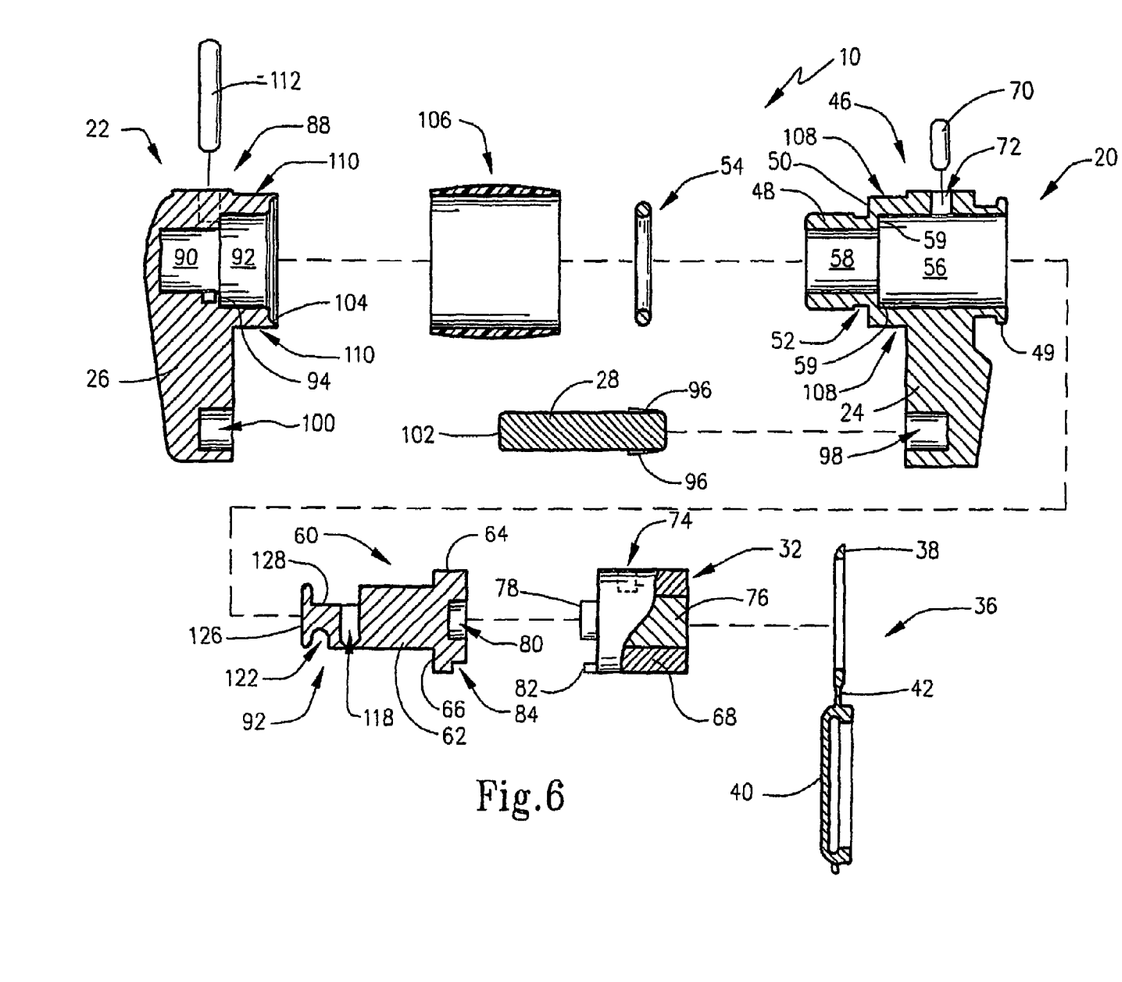
FIG. 6 is an exploded side view in partial cross-section showing the elements of the locking device according to the exemplary embodiment of the present invention.

While continued reference may be made to FIGS. 2-5, the more detailed structure of locking device 10 may be more fully appreciated in reference to FIG. 6. Here, it may be seen that first body member 20 has a housing portion 46 that is provided with a cylindrical nose 48 so as to define a seat 50. A circumferential groove 52 extends around nose 48 proximate to seat 50 in order to receive an O-ring 54. First body member 20 and, specifically, housing portion 46 thereof, has an open interior defined by a core chamber 56 and a nose chamber 58 which are in the form of cylindrical bores of different diameters so as to define a first shoulder 59 in the interior of first body member 20. Housing portion 46 also includes a lip 49 opposite nose 48 to form a mount for annular ring 38.

The interior of first body member 20 is sized and adapted to receive a retainer element 60 therein as well as lock core 32. To this end, and with reference also to FIGS. 7-9, it may be seen that retainer element 60 has a first end portion including a shank 62 and an enlarged base 64 so as to form a rim 66 that abuts shoulder 59 when assembled. A second end portion of retainer element 60 defines a latch portion that extends actually out of nose 48 when assembled, as described in greater detail below. Accordingly, when assembled, base 64 is positioned in core chamber 56 with shank 62 being received in nose chamber 58 for rotation therein.

Figure 9:
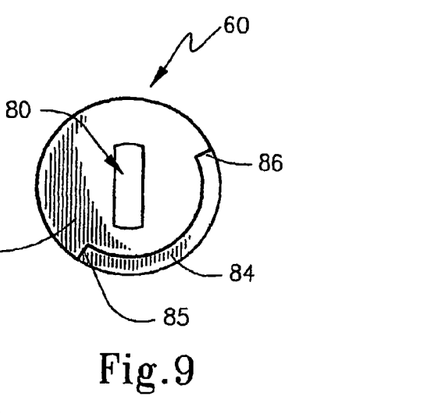
FIG. 9 is and end view in elevation showing the base of the retainer element of FIGS. 7 and 8.

Likewise, lock core 32 is positioned in core chamber 56 and engages retainer element 60. To this end, lock core 32 includes a casing 68 that may be secured in core chamber 56 by means of press pin 70 extending through bore 72 in first body member 20 such that press pin 70 extends into bore 74 in casing 68. A rotatable core 76 is received in casing 68 and is keyed thereto, as is known in the art so that this structure is not illustrated. Core 76 carries a prong 78 that is adapted to engage slot 80 in base 64 such that, upon rotation of core 76, retainer element 60 will undergo corresponding rotation. With reference to FIGS. 6 and 9 the amount of relative rotation is controlled by means of a tab 82 formed on lock core 32 and an arcuate slot 84 formed in the edge of base 64. Thus, ends 85 and 86 define rotational limit stops for retainer element 60 since, at the maximum degrees of rotation, end balls 85 and 86 engage tab 82 to prevent further rotation.

Second body member 22 also has a housing portion 88 with an interior that includes a pair of cylindrical cavities of different diameters. As is illustrated in FIG. 6, a latch cavity 90 is sized to rotatably receive the latch portion of retainer element 60 that is defined by latch portion 92 described more thoroughly below. When assembled, nose 48 is received in nose cavity 92 for rotational and sliding movement therein. Further, as may be seen in FIG. 6, a second shoulder 94 is formed at the junction of latch cavity 90 and nose cavity 92. Second body member 22 also receives a transverse latch pin 112 which intersects and extends across a portion of latch cavity 90, as is shown in FIG. 10, in order to define a catch for the latch portion of retainer element 60.

Shackle 28 may be seen to be an elongated cylindrical post that has a first end with teeth 96 that may be press fit into a bore 98 formed in first arm 24 so that shackle 28 is carried by first arm 24 of first body member 20. A corresponding bore 100 is formed in second arm 26 so that, when first and second body members 20 are moved into the collapsed orientation, free end 102 of shackle 28 engages bore 100.

As noted above, protective cap 36 is provided to protect the keying structure for lock core 32. To further help reduce the likelihood of ingress of unwanted contaminate materials, such as dirt, grease, etc., O-ring 54 is mounted in groove 52. When in the collapsed and locked state, O-ring 54 becomes trapped between seat 50 and rim 104 of head portion 88 of second body member 22. Further, a protective sleeve 106, formed of any suitable plastic material extends between the housing portions. To this end, housing portion 46 of first body member 20 and housing portion 88 of second body member 22 are respectively provided with landings 108 and 110 to receive and engage sleeve 106.

Figure 10:
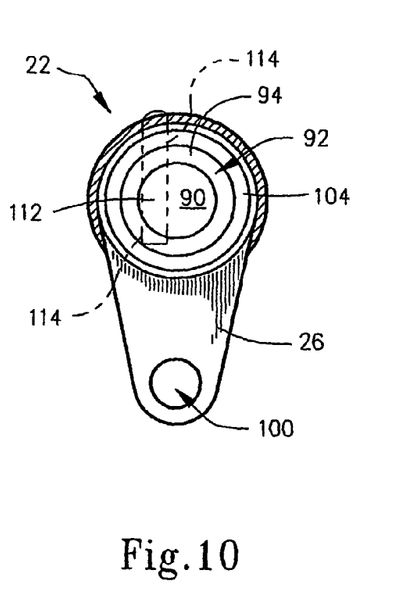
FIG. 10 is an end view in elevation showing the second body member of the locking device of FIG. 6 in order to illustrate the position of the catch pin therein.

With continued reference to FIG. 6, it may be seen that second body member 22 receives a transverse latch pin 112 which intersects and extends across a portion of latch cavity 90, as shown in FIG. 10. To this end, latch pin 112 is press fit into a bore 114 that is orthogonal tube that does not intersect rotational axis "A". Latch pin 112 is positioned as a catch to interact with both a latch portion and a retaining head that are disposed on retainer 60.

Figure 7:
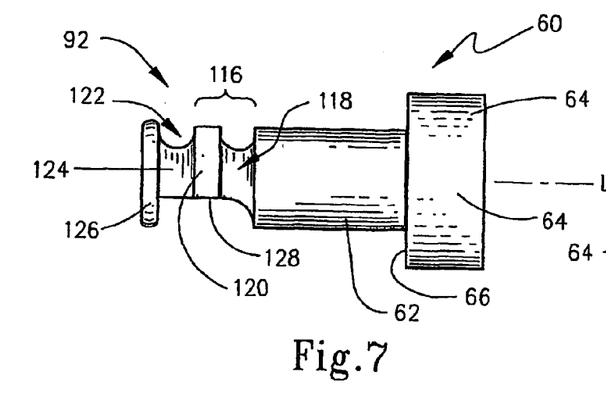
FIG. 7 is a side view in elevation of the retainer element shown in a first rotational position.
Figure 8:
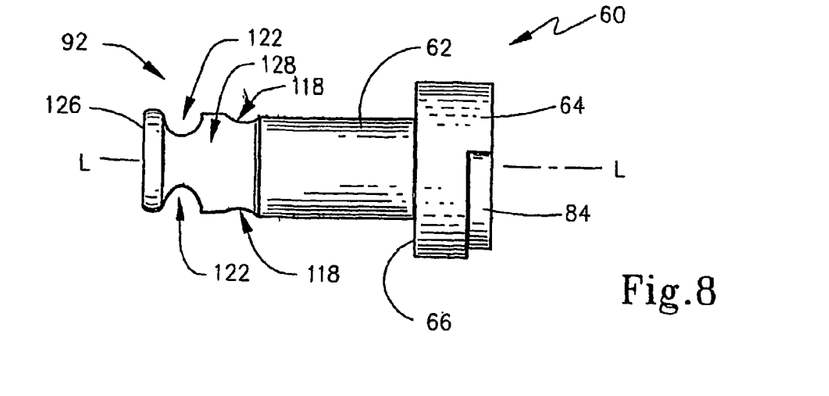
FIG. 8 is a side view in elevation, similar to FIG. 7, but showing the retainer element rotated 90 degrees.

To this end, the structure of retainer element 60 is illustrated in greater detail in FIG. 7-9. Here, it may be seen that retainer element 60 includes a latch portion 116 that includes a circumferential latch groove in the form of a channel 118 that extends at least partially around the circumference of retainer element 60 at a location adjacent to shank 62. Channel 118 is sized so that latch pin 112 may be received tangentially therein. A second channel 122 extends in parallel relationship to channel 118 on an opposite side of rib 120 so as to form a neck 124 with there being a retaining head 126 at an end of retainer element 60 opposite base 64. Retaining head 126 is in the form of a disk shaped plate oriented transversely to the longitudinal rotational axis "L" of retainer 60. A flat cam face 128 extends between retaining head 126 and shank 62, the purpose of which is described in greater detail below.

Figures 11A, 11B:
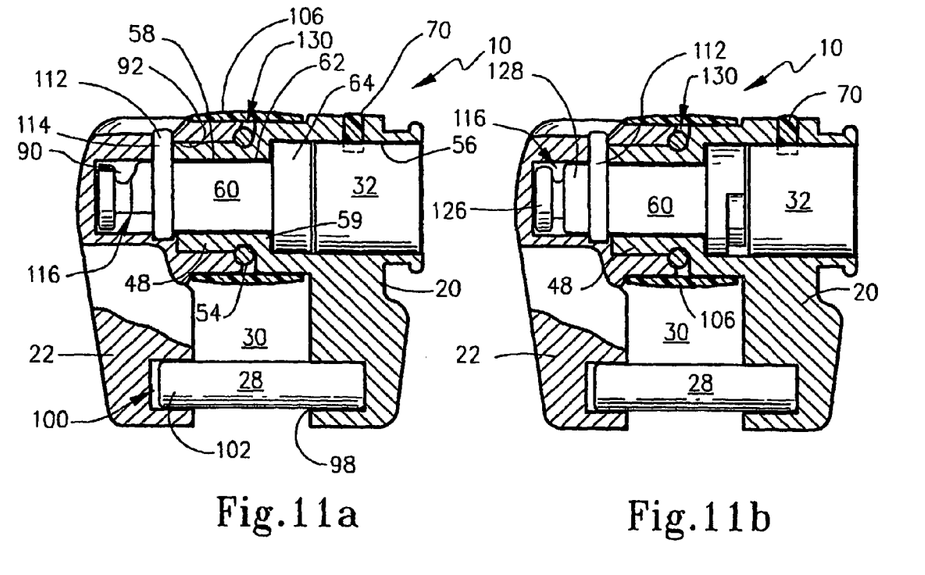
FIGS. 11(a)-11(c) are side views in partial cross-section showing the assembly of the locking device of the present invention in the collapsed orientation and locked state, in the collapsed orientation and unlocked state, and in the expanded orientation and unlocked state.
Figure 11C:
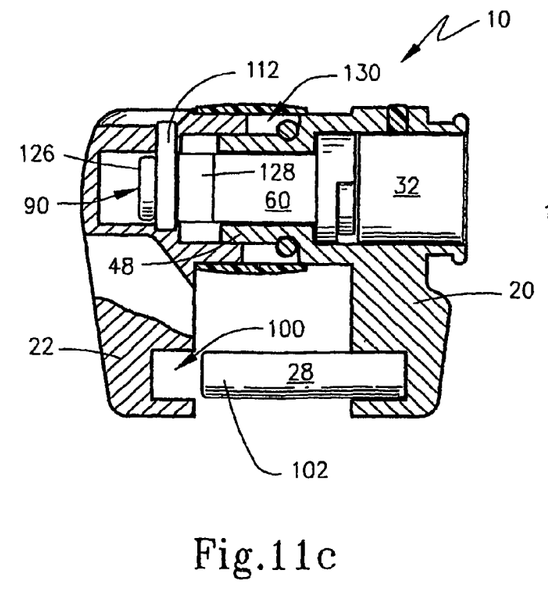

Having now described the components of locking device 10, the assembly and operation can be appreciated in greater detail with reference to FIGS. 11(a)-11(c). In these figures, it may be seen that retainer element 60 is mounted in the interior of first body member 20 so that shank 62 is located in nose chamber 58 with base 64 abutting shoulder 59. Latch portion 116 protrudes out of nose chamber 58. Lock core 32 is then positioned in core chamber 56, and it should be understood that tab 82 engages arcuate slot 84 when mounted. Press pin 70 is then placed in position to affix lock core 32 in the interior of first body member 20. O-ring 54 is then positioned in groove 52 and sleeve 106 is mounted either on landing 108 of first body member 20 or on landing 110 of second body member 22. Shackle 28 is pressed fit into bore 98.

At this point, first body member 20 carrying retainer element 60 is mated with second body member 22. To this end, nose 48 is positioned in nose cavity 92 with latch portion 116 projecting outwardly of nose 48 to be positioned in latch cavity 90. End 102 of shackle 28 is mateably inserted into bore 100 in second body member 22. At this point, with lock core 32 being in a locked position, latch pin 112 is inserted in bore 114 so that it extends along side shank 62 in channel 118. After affixing latch pin 112 in the position shown in FIG. 11(a), first body member and second body member 22 are locked in a collapsed orientation with shackle member 28 confining locking region 30. Retainer element 60 is in the retain position.

FIG. 11(b) illustrates locking device 10 in an unlocked configuration yet in the collapsed orientation. Here, key 34 has been used to rotate the rotatable core of locking core approximately 90 degrees from the locked state to the unlocked state. Due to the engagement of prong 78 with slot 80, this movement rotates retainer element 60 angularly 90° about a common rotational axis from the retain position to the release position. When this occurs, flat cam face 128 is moved into a parallel orientation with respect to latch pin 112. In this orientation, first body member 20 and second body member 22 can now be moved apart from one another to the expanded orientation shown in FIG. 11(c) likewise, the body members may be moved from the expanded orientation shown in FIG. 11(c) back to the collapsed orientation shown in FIG. 11(b). However, it should be appreciated that the expansion from the collapsed orientation to the expanded orientation may only be made until retaining head 126 comes into abutment with latch pin 112; thus; retaining head 126 interacting with latch pin 112 forms a limit stop for this longitudinal expansion since this abutment prevent further separation of first body member 20 and second body member 22. However, this separation is sufficient so that free end 102 of shackle 28 disengages from bore 100. Moreover, since latch pin 112 is now positioned in channel 122, first body member 20 and second body member 22 may be relatively rotated with respect to one another about common longitudinally extending rotational axis "A", as is illustrated in FIG. 5.

With further reference to FIGS. 11(a)-11(c), it should be appreciated that, when in the collapsed state shown in FIGS. 11(a) and 11(b), O-ring 54 is compressed between rim 104 of head portion 88 and seat 50 of head portion 46. In this position, also, sleeve 106 extends across gap 130 within which O-ring 54 resides. Upon movement to the expanded orientation shown in FIG. 11(c), gap 130 increases in longitudinal dimension but sleeve 106 has sufficient longitudinal extension to still enclose gap 130 thereby to protect the interior of locking device 10 against the ingress of unwanted materials. Cap portion 40 may be snap fit onto lip 49 at any time the actuating key is removed from lock core 32 in order to protect the keyway thereof.

Figures 12A, 12B:
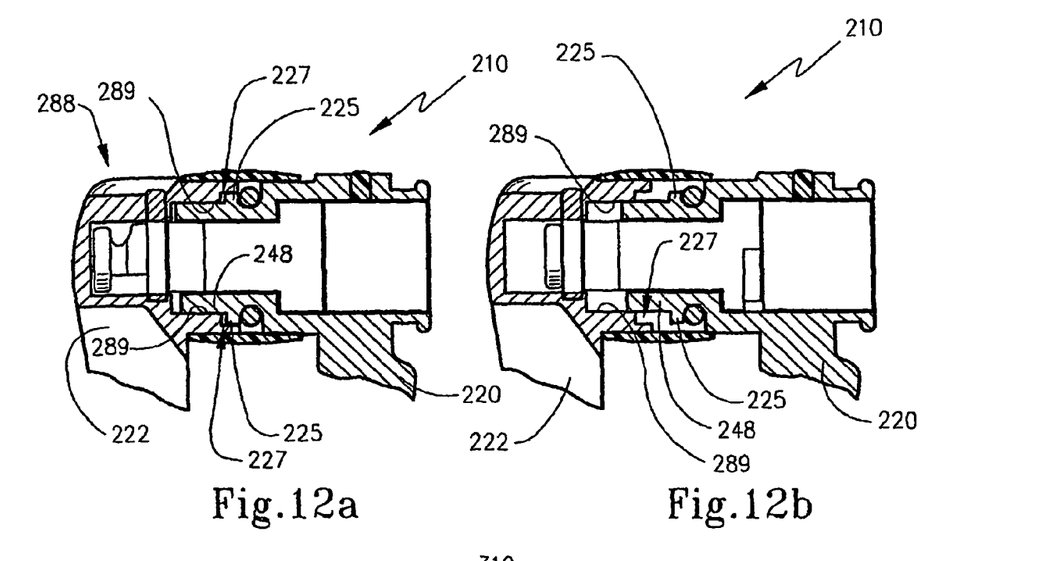
FIGS. 12(a) and 12(b) are side views in elevation and in partial cross-section showing a first alternative embodiment of the present invention having a first exemplary anti-rotation structure therewith.

With reference now to FIGS. 12(a) and 12(b), a second exemplary embodiment of the present invention is depicted. In this embodiment, locking device 210 is provided with an anti-rotation structure that prevents rotation of its body members 220 and 222 in the event that the shackle is severed. This anti-rotation structure is provided by a pair of nubs 225 located on nose 248 that engage a pair of respective locking slots 227 formed in the inner sidewall 289 of housing 288 when the first and second body members 220 and 222 are in the collapsed orientation, as is shown in FIG. 12(a). So long as first and second body members 220 and 222 are in the collapsed orientation, they may not be rotated relative to one another due to the locking engagement of these nubs 225 in channels 227. However when first and second body members 220 and 222 are moved apart into the expanded orientation, as shown in FIG. 12(b) nubs 225 disengage from channels 227 so that first and second body members 220 and 222 may rotate as described with respect to the first embodiment.

Figure 13A:
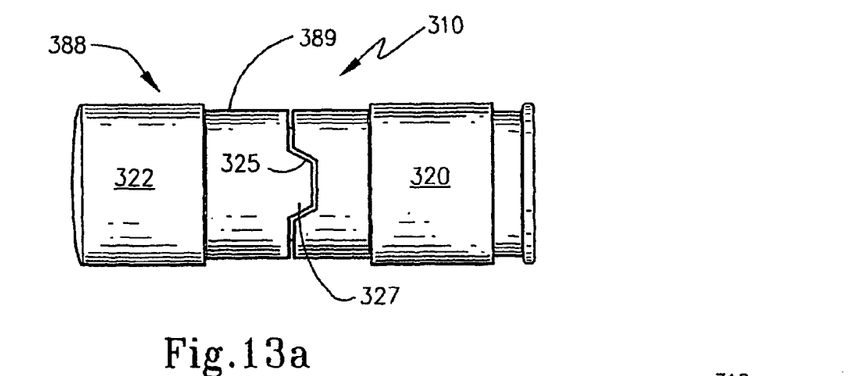
FIGS. 13(a) and 13(b) are top plan views of a second alternative embodiment of the present invention having a second exemplary anti-rotation structure associated therewith.
Figure 13B:
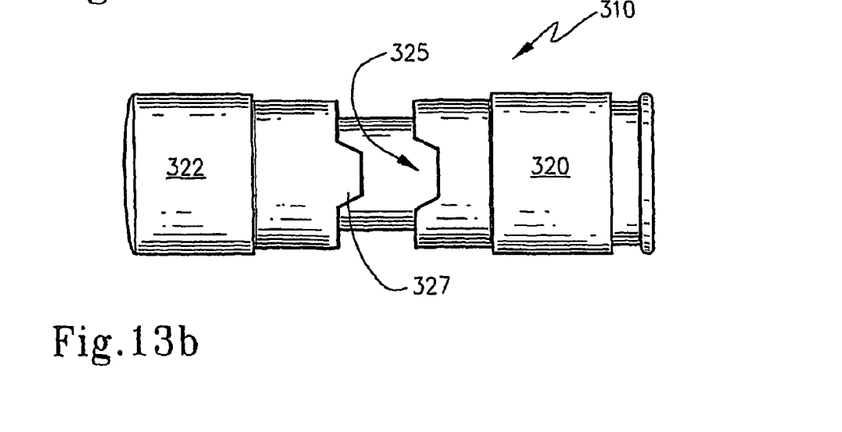

With reference now to FIGS. 13(a) and 13(b), a third exemplary embodiment of the present invention is depicted. In this embodiment, locking device 310 is provided with an anti-rotation structure that prevents rotation of its body members 320 and 322 in the event that the shackle is severed. This anti-rotation structure is provided by a protrusion 327 located on the outer sidewall 389 of housing 388 that engages a corresponding port 325 when the first and second body members 320 and 322 are in the collapsed orientation, as is shown in FIG. 13(a). So long as first and second body members 320 and 322 are in the collapsed orientation, they may not be rotated relative to one another due to the locking engagement of protrusion 327 in port 325. However when first and second body members 320 and 322 are moved apart into the expanded orientation, as shown in FIG. 13(b), protrusion 327 disengages from port 325 so that first and second body members 320 and 322 may rotate as described with respect to the first embodiment.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A locking device, comprising:
   (A) a first body member having a first interior;
   (B) a second body member having a second interior including a catch;
   (C) a retainer element including a first end portion received in the first interior, a second end portion received in the second interior, a latch portion, and a retaining head, said retainer element operative to mechanically link said first and second body members together for longitudinal movement between a collapsed orientation and an expanded orientation, said retainer element movable between a retain position wherein said latch portion is operative to engage said catch whereby the first and second body members are secured in the collapsed orientation and a release position wherein said latch portion is operative to release from said catch whereby the first and second body members may move between the collapsed orientation and said expanded orientation, said retaining head operative to engage said catch when said first and second body members are in the expanded orientation thereby to define a limit stop that prohibits movement of said first and second body members away from one another beyond the expanded orientation; and
   (D) a lock core disposed in the first interior and operative to engage said retainer element, said lock core having a locked state wherein said retainer element is held in the retain position and movable to an unlocked state wherein said retainer element is moved from the retain position to said release position.

2. A locking device according to claim 1 including a shackle extending between said first and second body members and operative to enclose a locking region when said first and second body members are in the collapsed orientation.

3. A locking device according to claim 1 including a sealing member positioned between said first and second body members whereby when said first and second body members are in the collapsed orientation, said sealing member facilitates a seal therebetween.

4. A locking device according to claim 1 wherein said first body member includes a first arm extending laterally thereof and wherein said second body member includes a second arm extending laterally thereof, said first and second arms being opposed to one another, when said first and second body members are in the collapsed orientation and said retainer element is in the retain position.

5. A locking device according to claim 4 wherein said first and second arms arm in generally parallel spaced-apart relation when said first and second body members are in the collapsed orientation and said retainer element is in the retain position.

6. A locking device according to claim 4 including an elongated shackle post disposed on a first one of said first and second arms and terminating in a free end.

7. A locking device according to claim 6 wherein a second one of said first and second arms includes a bore sized and adapted to matably engage the free end of said shackle post when said first and second body members are in the collapsed orientation.

8. A locking device according to claim 1 wherein said first and second body members are rotatable with respect to one another about a rotational axis when in the expanded orientation.

9. A locking device according to claim 1 wherein the first end portion of said retainer element is rotatably disposed about a retainer axis in the first interior and wherein the second end portion of said retainer element is rotatably disposed about the retainer axis in the second interior.

10. A locking device according to claim 9 wherein the retainer axis and the rotational axis are coaxial.

11. A locking device according to claim 9 wherein said lock core is rotatable mounted in the first interior such that said lock core rotates when it is moved between the locked and unlocked states thereby to rotate said retainer element between the retain and release positions.

12. A locking device, comprising:
    (A) a first body member having a first interior;
    (B) a second body member having a second interior including a transverse catch pin;
    (C) a retainer element including a first end portion received in the first interior, a second end portion received in the second interior, and a latch groove formed in said retainer element sized and adapted to engage said pin, said retainer element operative to mechanically link said first and second body members together for longitudinal movement between a collapsed orientation and an expanded orientation, said retainer element movable between a retain position wherein said latch groove is operative to engage said pin whereby the first and second body members are secured in the collapsed orientation and a release position wherein said latch groove is operative to release from said pin whereby the first and second body members may move between the collapsed orientation and said expanded orientation; and
    (D) a lock core disposed in the first interior and operative to engage said retainer element, said lock core having a locked state wherein said retainer element is held in the retain position and movable to an unlocked state wherein said retainer element is moved from the retain position to said release position.

13. A locking device according to claim 12 wherein said retainer element includes a retaining head operative to engage said pin when said first and second body members are in the expanded orientation thereby to define a limit stop that prohibits movement of said first and second body members away from one another beyond the expanded orientation.

14. A locking device according to claim 13 wherein said retainer element has a cam face extending between said retaining head and the latch groove and operative to permit movement of said pin therealong whereby said first and second body members may move between the expanded and collapsed orientations.

15. A locking device, comprising:
    (A) a first body member having a first interior;
    (B) a second body member having a second interior;
    (C) a retainer element including a first end portion received in the first interior and a second end portion received in the second interior, said retainer element operative to mechanically link said first and second body members together for longitudinal movement between a collapsed orientation and an expanded orientation, said retainer element movable between a retain position wherein said retainer element secures the first and second body members in the collapsed orientation and a release position wherein said first and second body members may move between the collapsed orientation and said expanded orientation;
    (D) a lock core disposed in the first interior and operative to engage said retainer element, said lock core having a locked state wherein said retainer element is held in the retain position and movable to an unlocked state wherein said retainer element is moved from the retain position to said release position; and (E) a protective sleeve extending between said first and second body members, at least one of said first and second body members being longitudinally movably within said sleeve.

16. A locking device comprising:

(A) a first body member including a first housing portion and a first arm portion extending laterally of said first housing portion, said first housing portion including a cylindrical nose projecting longitudinally thereof and a first interior defined by a cylindrical nose bore formed in said nose and in communication with a cylindrical core bore formed in said first housing portion;

(B) a second body member including a second housing portion and a second arm portion extending laterally from said second housing portion, said second housing portion having a second interior including a latch cavity, a nose cavity sized and adapted to slideably receive said nose therein, and a catch;

(C) a retainer element operative to mechanically link said first and second body members together for longitudinal movement between a collapsed orientation and an expanded orientation, said retainer element rotatable about a longitudinally extending retainer axis between a retain position wherein said retainer element secures the first and second body members in the collapsed orientation and a release position wherein said first and second body members may be moved between the collapsed orientation and said expanded orientation, said retainer element including:

(1) a base received in the core bore;
(2) a shank portion extending longitudinally of said base and received in the nose bore;
(3) a latch portion projecting longitudinally outwardly of said nose and operative to engage said catch when said retainer element is in the retain position and to release from said catch when in the release position; and
(4) a retaining head operative to engage said catch when said first and second body members are in the expanded orientation thereby to define a limit stop that prohibits movement of said first and second body members away from one another beyond the expanded orientation;

(D) a lock core disposed in the first interior and operative to engage said retainer element, said lock core rotatable between a locked state wherein said retainer element is placed in the retain position and an unlocked state wherein said retainer element is placed in the release position; and (E) a shackle extending between said first and second arm portions and operative with said first and second body members to enclose a locking region when said first and second body members are in the collapsed orientation.

17. A locking device according to claim 16 wherein said catch is defined by a transverse pin, said latch portion including a latch groove formed therein in spaced relation to said retaining head and sized and adapted to engage said pin when in the retain position.

18. A locking device according to claim 17 wherein said retainer element has a cam face extending between said retaining head and the latch groove so as to permit movement of said pin therealong whereby said first and second body members may move between the expanded and collapsed orientations.

19. A locking device according to claim 16 including a seat associated with said nose and including an O-ring sealing member positioned at said seat whereby, when said first and second body members are in the collapsed orientation, said sealing member facilitates a seal therebetween.

20. A locking device according to claim 16 wherein said retainer element includes limit stops operative to constrain said retainer element for rotational movement between first and second angular positions.

21. A locking device according to claim 16 including a cap member secured to said first body member and adapted to fit over an exposed face of said lock core.

22. A locking device according to claim 16 wherein said first and second arms are in generally parallel spaced-apart relation when said first and second body members are in the collapsed orientation and said retainer element is in the retain position.

23. A locking device according to claim 16 wherein said shackle is defined by an elongated shackle post disposed on a first one of said first and second arms and terminating in a free end.

24. A locking device according to claim 23 wherein a second one of said first and second arms includes a bore sized and adapted to matably engage the free end of said shackle post when said first and second body members are in the collapsed orientation.

25. A locking device according to claim 16 wherein said first and second body members are rotatable with respect to one another about a rotational axis when in the expanded orientation.

26. A locking device according to claim 25 wherein the retainer axis and the rotational axis are coaxial.

27. A locking device according to claim 16 wherein said lock core is key actuable.

28. A locking device comprising:

(A) a first body member including a first housing portion and a first arm portion extending laterally of said first housing portion, said first housing portion having a first interior;

(B) a second body member including a second housing portion and a second arm portion extending laterally from said second housing portion, said second housing portion having a second interior;

(C) a retainer element including a first end portion rotatably received in the first interior and a second end portion rotatably received in the second interior, said retainer element operative to mechanically link said first and second body members together for longitudinal movement between a collapsed orientation and an expanded orientation, said retainer element rotatable about a longitudinally extending retainer axis between a retain position wherein said retainer element secures the first and second body members in the collapsed orientation and a release position wherein said first and second body members may be moved move between the collapsed orientation and said expanded orientation;

(D) a lock core disposed in the first interior and operative to engage said retainer element, said lock core rotatable between a locked state wherein said retainer element is placed in the retain position and an unlocked state wherein said retainer element is placed in the release position;

(E) a shackle extending between said first and second arm portions and operative with said first and second body members to enclose a locking region when said first and second body members are in the collapsed orientation; and (F) a protective sleeve extending between said first and second housings, at least one of said first and second housings being longitudinally movably within said sleeve.

29. A locking device comprising:
(A) a first body member including a first housing portion and a first arm portion extending laterally of said first housing portion, said first housing portion including a cylindrical nose projecting laterally thereof and a first interior defined by a cylindrical nose bore formed in said nose and in communication with a cylindrical core bore formed in said first housing portion;
(B) a second body member including a second housing portion and a second arm portion extending laterally from said second housing portion, said second housing portion having a second interior including a latch cavity, a nose cavity sized and adapted to rotatably and slideably receive said nose therein, and a catch;
(C) a retainer element including a base rotatably received in the core bore, a shank portion extending longitudinally of said base and received in the nose bore, and a latch portion projecting longitudinally out of said nose portion and slidably and rotatably received in the latch cavity so as to selectively engage said catch, said retainer element operative to mechanically link said first and second body members together for longitudinal movement between a collapsed orientation and an expanded orientation and such that said first and second housing portions are linked for rotational movement about a longitudinally extending rotational axis, said retainer element rotatable about a longitudinally extending retainer axis between a retain position wherein said latch portion engages said catch when said retainer element is in the retain position thereby to secure the first and second body members in the collapsed orientation and releases from said catch when in the release position whereby said first and second body members may be moved between the collapsed orientation and the expanded orientation;
(D) a lock core disposed in the first interior and operative to engage said retainer element, said lock core rotatable between a locked state wherein said retainer element is placed in the retain position and an unlocked state wherein said retainer element is placed in the release position; and
(E) a shackle extending between said first and second arm portions and operative with said first and second body members to enclose a locking region when said first and second body members are in the collapsed orientation.

30. A locking device according to claim 29 wherein the rotational axis and the retainer axis are co-axial.

31. A locking device according to claim 29 wherein said first and second housing portions may be rotated 360° when said first and second body members are in the expanded orientation.

32. A locking device according to claim 29 wherein said second housing has an outer rim and including a sealing member positioned on said nose and operative to facilitate a seal between said first housing and the rim of said second housing when said first and second body members are in the collapsed orientation.

33. A locking device comprising:
(A) a first body member including a first housing portion and a first arm portion extending laterally of said first housing portion, said first housing portion having a first interior;
(B) a second body member including a second housing portion and a second arm portion extending laterally from said second housing portion, said second housing portion having a second interior with a catch therein;
(C) a retainer element including a first end portion rotatably received in the first interior and a latch portion longitudinally extending out of said first housing and rotatably received in the second interior so as to selectively engage said catch, said retainer element operative to mechanically link said first and second body members together for longitudinal movement between a collapsed orientation and an expanded orientation and such that said first and second housing portions are linked for rotational movement about a longitudinally extending rotational axis, said retainer element rotatable about a longitudinally extending retainer axis between a retain position wherein said latch portion engages said catch when said retainer element is in the retain position thereby to secure the first and second body members in the collapsed orientation and releases from said catch when in the release position whereby said first and second body members may be moved between the collapsed orientation and the expanded orientation, said latch portion includes a retaining head operative to engage said catch when said first and second body members are in the expanded orientation thereby to define a limit stop that prohibits movement of said first and second body members away from one another beyond the expanded orientation;
(D) a lock core disposed in the first interior and operative to engage said retainer element, said lock core rotatable between a locked state wherein said retainer element is placed in the retain position and an unlocked state wherein said retainer element is placed in the release position; and
(E) a shackle extending between said first and second arm portions and operative with said first and second body members to enclose a locking region when said first and second body members are in the collapsed orientation.

34. A locking device according to claim 33 wherein said catch is defined by a transverse pin, said latch portion including a groove formed in said latch portion element in spaced relation to said retaining head and sized and adapted to engage said pin when in the retain position.

35. A locking device according to claim 34 wherein said retainer element has a flat cam face extending longitudinally between said retaining head and the latch groove so as to permit movement of said pin therealong whereby said first and second body members may move between the expanded and collapsed orientations.

36. A locking device according to claim 33 wherein said retainer element includes limit stops operative to constrain said retainer element for rotational movement between first and second angular positions.

* * * * *